(12) United States Patent
Danknick (10) Patent No.: US 6,724,494 B1
(45) Date of Patent: Apr. 20, 2004

(54) ERROR MANAGEMENT FOR A TANDEM PRINTING SYSTEM

(75) Inventor: Daniel A. Danknick, Orange, CA (US)

(73) Assignee: Toshiba Tech Corp, Kawasaki (JP)

( * ) Notice: Subject to any disclaimer, the term of this patent is extended or adjusted under 35 U.S.C. 154(b) by 0 days.

(21) Appl. No.: 09/559,291

(22) Filed: Apr. 25, 2000

Related U.S. Application Data (60) Provisional application No. 60/163,272, filed on Nov. 3, 1999.

(51) Int. Cl.[7] ................................................ G06K 15/00
(52) U.S. Cl. ...................................... 358/1.14; 358/1.4
(58) Field of Search ................................ 358/1.1, 1.13, 358/1.14, 1.15, 404, 405, 468, 407, 1.4; 710/15, 16, 17, 19, 48, 62, 58, 59

(56) References Cited

U.S. PATENT DOCUMENTS 6,452,692 B1 * 9/2002 Yacoub ...................... 358/1.15

* cited by examiner

Primary Examiner—Arthur G. Evans
(74) Attorney, Agent, or Firm—Tucker Ellis & West LLP (57) ABSTRACT

The disclosure relates to methods and apparatus for handling error occurrences in an image outputting system. The system comprises plural multifunction peripherals (MFPs) for printing a document. Each MFP is communicatively coupled to a single control unit, the control unit being communicatively coupled to a computer workstation on a computer network. The control unit receives a print job from the computer workstation and then sends the print job to one or more hard output units. The control unit monitors the status of the print job with respect to each MFP to determine whether an error is present in any of the MFPs. If the control unit detects an error, it waits a predetermined time period to provide a user time to fix the error. If the user does not fix the error within the predetermined time period, the control unit then polls the status of the remaining MFPs to determine whether any other MFPs are error-free. The control unit then sends the print job to one or more of the error-free MFPs. If the print job includes multiple copies of a single document, the control unit desirably divides the copies between several MFPs in order to minimize the overall print time.

18 Claims, 4 Drawing Sheets

ERROR MANAGEMENT FOR A TANDEM PRINTING SYSTEM

RELATED APPLICATION INFORMATION

This application claims priority to U.S. Provisional Application Serial No. 06/163,272, entitled "Error Management for a Tandem Printing System," filed Nov. 3, 1999, which is incorporated herein by reference.

This application is related to the following U.S. provisional patent applications, each of which is incorporated herein by reference: (1) U.S. Provisional Patent Application Serial No. 60/163,360, entitled "Synchronous Printing," filed Nov. 3, 1999; (2) U.S. Provisional Patent Application Serial No. 60/163,343, entitled "Generation of Cover Sheets by a Networked Printer," filed Nov. 3, 1999; and (3) U.S. Provisional Patent Application Serial No. 60/163,344, entitled "Dynamic Load Balancing for a Tandem Printing System," filed Nov. 3, 1999.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure, as it appears in the Patent and Trademark Office patent files or records, but otherwise reserves all copyright and trade dress rights whatsoever.

BACKGROUND OF THE INVENTION

1. Field of the Invention

The present invention relates generally to image forming apparatuses and, more particularly, to methods and apparatuses for managing error events that occur in relation to the output of images using such apparatuses.

2. Description of Related Art

One primary feature in an effective print system is the amount of time that it takes to output a print job. Generally, a user desires to output a print job as quickly as possible. Toward this end, most contemporary operating systems, such as Microsoft Windows, permit a user to print a document to any number of printers that communicate with a computer workstation. Multiple copies of a print job are sometimes divided up among multiple designated printers in order to take advantage of the increased output capacity provided by multiple printers as opposed to a single printer.

However, regardless of the number of available printers, the output time for a print job is delayed if one of the designated printers encounters an error during printing. In cases where multiple copies of a print job are divided among several printers, the user may be unaware that one of the printers stopped printing due to an error. The fact may not be discovered until the user counts all of the copies of the job and discovers that one or more copies have not been printed by one of the printers. The user must then re-send the print job to account for the missing or incomplete copies. This is both inefficient with respect to time and with respect to the use of printing resources, which are wasted if a printjob is interrupted.

The problem is exacerbated where multiple-printer systems are in use, as individual workstations may be at some distance from the printer or printers that output the paper copies of a document. Thus, an individual may not be present to monitor the status of the print job after it is submitted for printing. Even an individual who is stationed near such a device may not be aware of the status of his or her job. If there is a delay in the output of the print job, the user may simply attribute the delay to the print job being at the bottom of the print queue.

SUMMARY OF THE INVENTION

The previously described problems are solved by the image processing and output system disclosed herein. The system relates to a method and apparatus for managing and recovering errors that occur in relation to printing of documents in a computer network system. The system allows a user to designate various modes of printing a document and provides various levels of error management depending on the designated print mode. The system also identifies detected errors within a predetermined category and initiates an error recovery process that varies depending on the error category.

In accordance with one aspect of the invention, there is disclosed a method of managing error occurrences in an image processing system. The system comprises plural multifunction peripherals or hard output units for printing a document. Each hard output unit is communicatively coupled to a single control unit, the control unit being communicatively coupled to a computer workstation on a computer network. The control unit receives a print job from the computer workstation and then sends the print job to one or more hard output units. The control unit monitors the status of the print job with respect to each hard output unit to determine whether an error is present in any of the hard output units. If the control unit detects an error, it waits a predetermined time period to provide a user time to fix the error. If the user does not fix the error within the predetermined time period, the control unit then polls the status of the remaining hard output units to determine whether any other hard output units are error-free. The control unit then sends the print job to one or more of the error-free hard output units. If the print job includes multiple copies of a single document, the control unit desirably divides the copies between several hard output units in order to minimize the overall print time.

Still further objects and advantages attaching to the device and to its use and operation will be apparent to those skilled in the art from the following particular description.

DESCRIPTION OF THE DRAWINGS

Further objects of this invention, together with additional features contributing thereto and advantages accruing therefrom, will be apparent from the following description of a preferred embodiment of the present invention which is shown in the accompanying drawings with like reference numerals indicating corresponding parts throughout and which is to be read in conjunction with the following drawings, wherein.

These and additional embodiments of the invention may now be better understood by turning to the following detailed description wherein an illustrated embodiment is described.

DETAILED DESCRIPTION OF THE INVENTION

Throughout this description, the preferred embodiment and examples shown should be considered as exemplars, rather than limitations on the apparatus and methods of the present invention.

Figure 1:
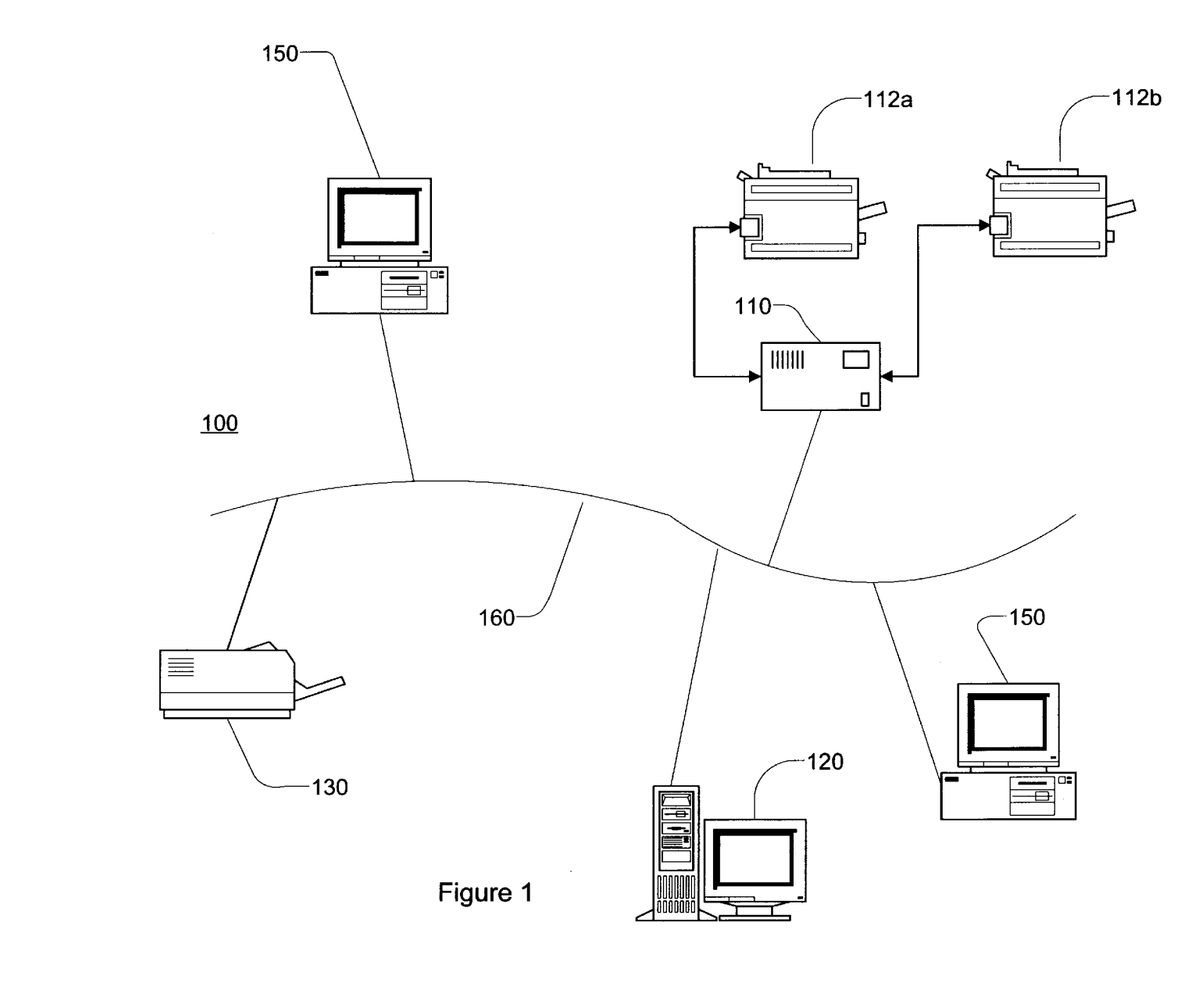
FIG. 1 is a block diagram of a LAN including a plurality of multifunction peripherals.

Referring now to FIG. 1 there is shown a block diagram of a local area network (LAN) 100 in accordance with the present invention. The LAN 100 includes a file server 120, printer 130, workstations 150, and a Host 110 coupled to one another via network communications lines 160. The Host 110 is also referred to as a control unit or controller. The file server 120 and workstations 150 are preferably those well known in the art, such as computers having Intel Corporation (Santa Clara, Calif.) microprocessors and running Microsoft Corporation (Redmond, Wash.) Windows or Windows NT operating systems. One or more hard output units or multifunction peripherals (MFP) 112a and 112b (collectively multifunction peripherals 112) are communicatively coupled to the Host 110. The LAN 100 may also include hubs, routers and other devices (not shown).

Before proceeding to describe the LAN 100, a few terms are defined. By "file server," it is meant a computer which controls access to file and disk resources on a network, and provides security and synchronization on the network through a network operating system. By "server," it is meant hardware or software which provides services to other hardware or software. By "workstation," it is meant a client computer which routes commands either to its local operating system or to a network interface adapter for processing and transmission on the network. A workstation may function as a server by including appropriate software, and may be for example, a print server, archive server or communication server. By "software" it is meant one or more computer interpretable programs and modules related and preferably integrated for performing a desired function. A "multifunction peripheral" is a peripheral which provides the functions of more than one peripheral, typically providing printing and at least one of: copying, scanning and faxing.

By "printer driver" it is meant (1) a program which takes into account the physical characteristics of a printer and which is used to convert graphics and text into device-specific data at the time of printing; or (2) a file which describes the physical characteristics of a printer and which is used by an operating system or other software to convert text and graphics into device-specific data at the time of printing.

Figure 2:
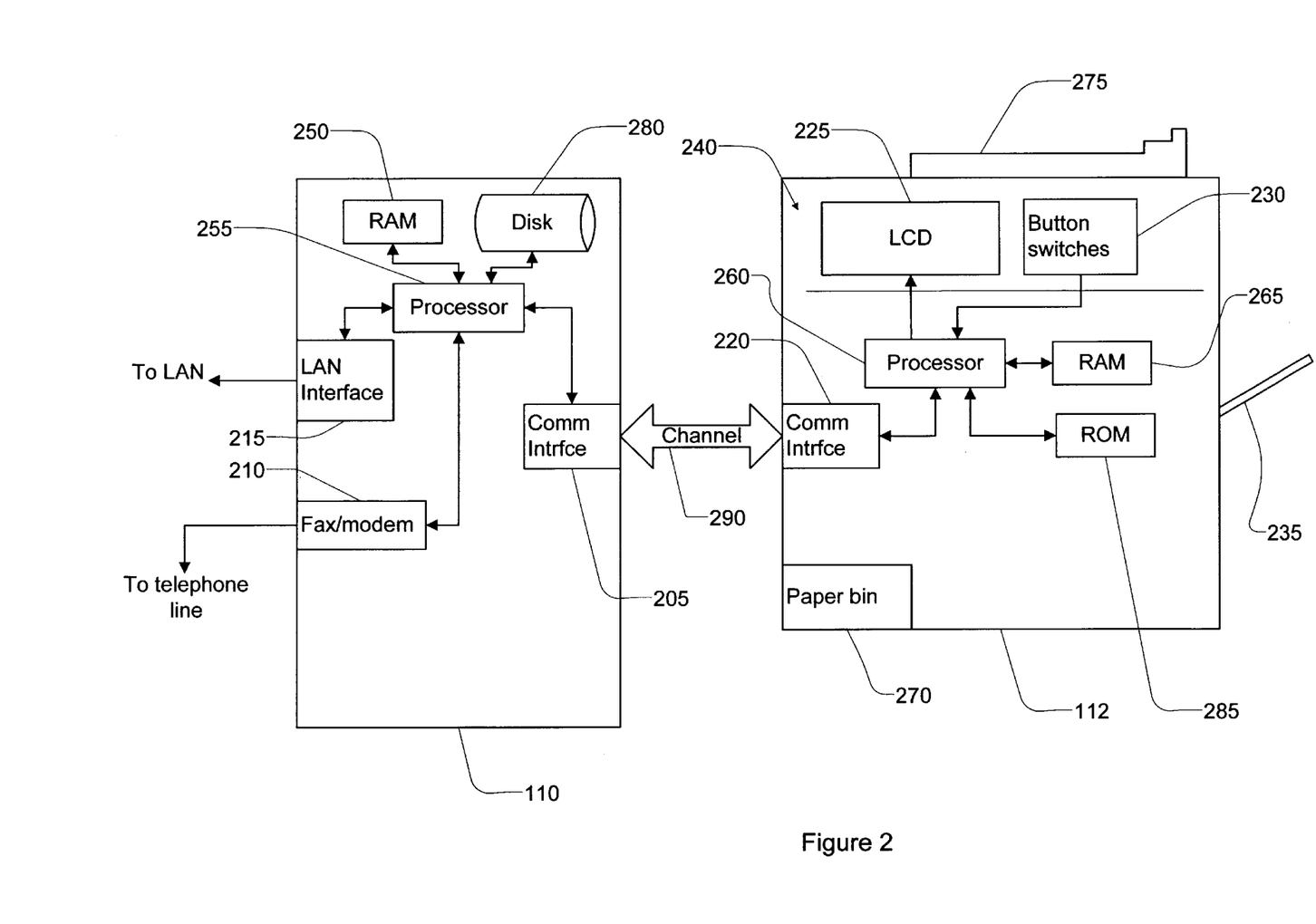
FIG. 2 is a block diagram of a data processing system including a Host and a first multifunction peripheral.

Turning now to FIG. 2, there is shown a block diagram of a data processing system comprising the MFP 112a and the Host 110. Each of the MFPs 112a and ,112b are configured as shown in FIG. 2 and are communicatively coupled to the same Host 110 as shown in FIG. 2. However, for ease of illustration, FIG. 2 shows only a single MFP 112a. The following description of MFP 112a applies equally to MFP 112b.

The MFP 112a preferably comprises a high output digital copier having a communications interface 220, which as presently embodied comprises a small computer systems interface (SCSI). The MFP 112a further preferably comprises a hardware and software interface which allows the MFP 112a to receive rasterized print jobs from the Host 110, manage the print jobs as well as its own copy jobs, and print the print jobs. The hardware and software interface of the MFP 112a further allows the MFP 112a to forward facsimile send jobs from the MFP 112a to a fax/modem 210 in the Host 110. The MFP 112a includes a short term memory 265, which preferably comprises random access memory (RAM) and a processor 260 in which programs are stored and run, respectively, for controlling the functions of the MFP 112a. The MFP 112a preferably also includes a long term memory 285 such as a read only memory (ROM) or electronically programmable read only memory (EPROM). The MFP 112a may also include a disk drive (not shown) for both long term and short term storage. The MFP 112a includes standard components including an automatic document feeder 275, paper bin 270 and paper output tray 235.

The MFP 112a includes a non-fixed display 225, preferably a liquid crystal display (LCD), and a user input device 230, such as button switches. The MFP 112a has user interface software stored in the memory 285 which is responsible for displaying information on the display 225 and interpreting user inputs from the user input device 230. The non-fixed display 225 and user input device 230 comprise an operator console 240, which, together with the user interface software, comprise a panel subsystem.

The Host 110 preferably comprises a server, and is a computer having an Intel processor 255 and running Microsoft Windows NT. In conjunction with the processor 255, the Host 110 has a short term memory 250 (preferably RAM) and a long term memory 280 (preferably a hard disk) as known in the art. A fax/modem 210 is for sending and receiving facsimiles via telephone lines. The Host 110 preferably provides storage, for example in long term memory 250, for holding incoming facsimile transmissions for extended periods and in substantial amounts when a hold is placed on printing facsimile jobs. The Host 110 includes a communications interface 205 through which the Host 110 communicates with the MFPs 112 via a channel 290. Preferably, the communications interface 205 is configured as a SCSI Host.

The Host 110 further preferably comprises a hardware 215 and software interface which allows the Host 110 to receive print jobs and facsimile send jobs from the LAN 100, receive facsimile jobs from the MFPs 112 and transmit rasterized print jobs to the MFP 110. The Host 110 includes management software stored in the long term memory 280 for managing print jobs, facsimile jobs and scan jobs. The Host 110 rasterizes print jobs received from the computer workstation 150 via the LAN 100 into print data (in a form native to the MFPs 112) and transmits the print data to the MFPs 112 via the communications interface 205. The Host 110 executes facsimile send jobs, received from either the LAN 100 or the MFPs 112, on the fax/modem 210.

A user can submit a print job to the Host 110 from any of the workstations 150. A print job is defined as a file containing data descriptive of a document to be printed, contrasted with documents in various application formats. When submitting a print request, the user preferably specifies a copy count, which is the number of copies of the print job that the user desires printed. The copy count can be single or plural. Preferably, the Host 110 is configured to submit the print job to the MFPs 112 according to either a standard configuration or a tandem mode configuration. In the standard configuration, the Host 110 sends the print job to a single MFP 112. All copies in the copy count are printed by the single MFP 112. In the tandem mode, the Host 110 utilizes multiple MFPs 112 to print a print job. The Host 110 preferably distributes multiple copies of a print job between the multiple MFPs 112 in order to decrease the overall print time. In dividing up the copies between the MFPs 112, the Host preferably utilizes predetermined routing criteria to minimize the amount of time that it takes to output the entire copy count.

Figure 3:
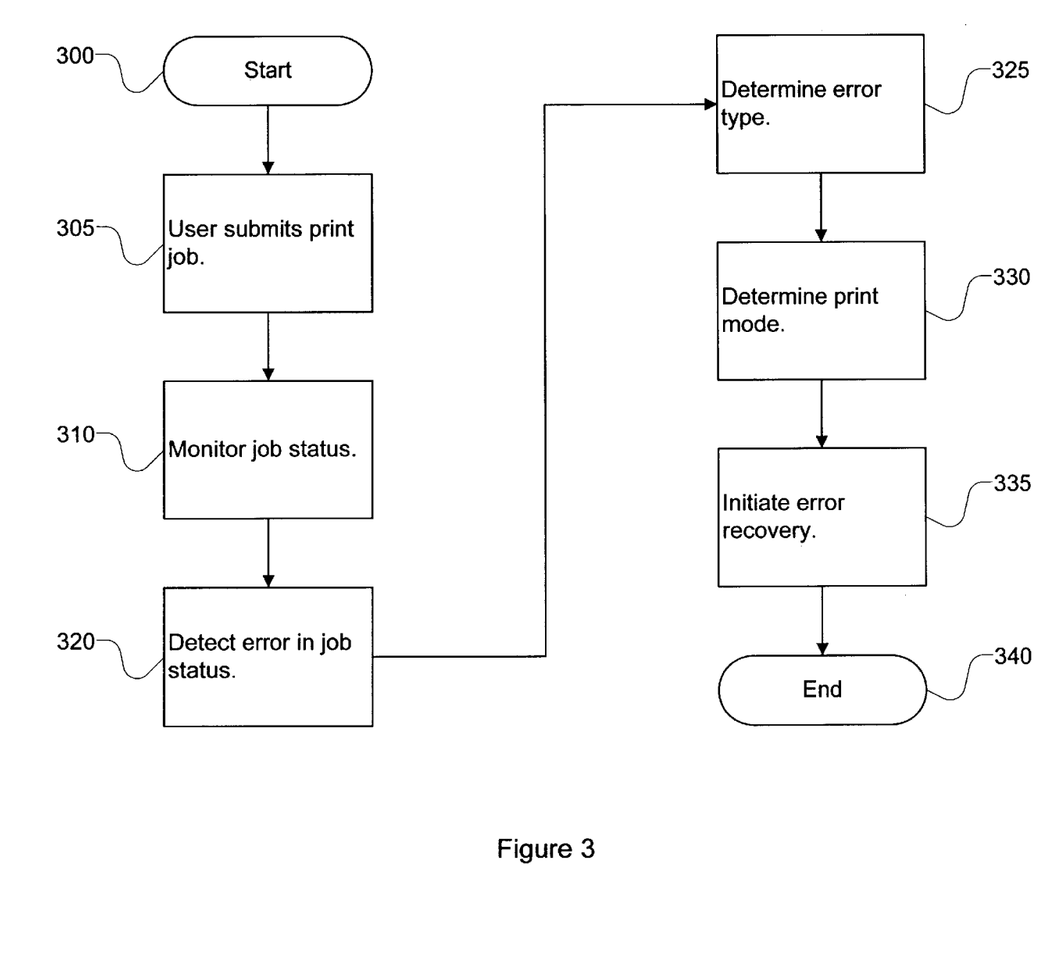
FIG. 3 is a flowchart of a method of monitoring error status for an image processing system.

FIG. 3 is a flow chart that describes a process by which the Host 110 detects and deals with errors encountered during the printing process. An error is any event that causes an MFP 112 to interrupt the printing of a print job. An error may be caused by hardware or software malfunction or by user interaction, such as if a user manually interrupts an MFP 112 while the MFP 112 is printing. The Host 110 preferably includes software that is used to implement the process. The process begins when a user submits a print job for printing (step 305). The user generally uses a software application on the computer workstation 150 to submit a print request. The resultant print job is processed by the computer workstation 150 in conjunction with a printer driver that is present in the memory of the computer workstation 150. The computer workstation 150 then submits the print job to the Host 110. The Host 110 further processes the print job and submits the job to one or more of the MFPs 112 for printing, depending on whether the Host 110 is operating in standard mode or in tandem mode. The MFPs 112 then either immediately begin printing the job or store the job within a print queue.

The Host 110 preferably continually monitors the job status of all print jobs that have been submitted to the MFPs 112 for printing (step 310). The Host 110 preferably monitors the status of the print job for each MFP 112. The Host 110 determines whether any errors are present in any of the MFPs 112 with respect to the print job and interrupted the print job. Generally, when an error occurs, the MFP 112 that incurred the error stops printing the job.

In accordance with one aspect of the invention, the Host 110 preferably classifies the error as a particular type of error (step 325). Preferably, the Host classifies the error as either (1) a recoverable error; or (2) an unrecoverable error. A recoverable error is an error that may be overcome by intervention of the user or by the Host 110b. When an error on an MFP 112 is overcome, the MFP 112 is returned to a state in which the MFP 112 can continue printing. Examples of recoverable errors that may be overcome by user intervention include paper jams on an MFP 112, out-of-paper errors, and out-of-toner errors. The user does not require any specific expertise in order to correct recoverable errors. The Host 110 may also overcome certain recoverable errors, such as by forcing a reset on an MFP 112 and providing the MFP 112 with a new print instruction. Generally, a print job may be continued on an MFP 112 if an unrecoverable error is encountered and overcome for that print job.

An unrecoverable error is an error for which correction requires more resources than may be provided by a user or the Host 110. Some examples of unrecoverable errors that may not be overcome by the user are hardware failures and print job corruption. A print job may generally not be continued on an MFP if the MFP has incurred an unrecoverable error.

In step 330, the Host 110 determines the print mode that the user assigned to the interrupted print job. A print mode is a mode of operation that governs how the Host 110b instructs the MFPs 112 to output a print job. The user preferably specifies the print mode of operation via a software user interface on the computer workstation 150 when submitting a print request. In one embodiment, there are four different print modes in addition to tandem and standard that are available to the user. The four print modes include (1) Print to Specific mode; (2) Print to Best mode; (3) Proof Print mode; and (4) Private Print mode. Each of the modes is described below.

The first print mode of operation is referred to as Print to Specific mode. If the user selects Print to Specific mode for a print job, the Host 110 sends the print job to a single MFP 112 and instructs the MFP 112 to output the print job. The user preferably specified which MFP 112 will receive the print job using the user interface on the computer workstation 150. Because the user designates a specific MFP 112 for printing, the tandem mode is preferably unavailable if the user designates a print job as a Print to Specific job.

The second print mode of operation is referred to as Print to Best mode. If the user specifies Print to Best mode for a print job, the Host 110 sends the print job to whichever MFP 112 that is able to output the print job in the least amount of time. In other words, the word "best" in Print to Best mode is synonymous with "fastest." The Host 110b selects the fastest MFP 112 at its own discretion preferably based upon the job load of each MFP 112, the error status of each MFP 112, and the speed at which the MFP 112 can print pages. Preferably, Print to Best print jobs are printed by only a single MFP 112 at one time and not printed on two MFPs 112 at the same time.

The third print mode of operation is referred to as Proof Print mode. For a print job with a print count greater than one, this mode provides the user with the ability to verify a single copy of a print job output before an MFP 112 prints additional copies of the print job. When the user submits a job designated as Proof Print, the Host 110 proceeds in the following manner. Regardless of the number of copies of the print job specified by the user, the Host 110 instructs a "lit" MFP to print one copy of the print job document. The lit MFP 112 is an MFP 112 that has an active user input device 230. Preferably only a single MFP 112 is lit. Either of the MFPs 112a or 112b may be designated as the lit MFP. For convenience, MFP 112a is referred to as the lit MFP for the description herein.

After the lit MFP 112a a prints a first copy of the print job, the display 225 on the lit MFP 112a presents a notification to the user that the first copy, or proof copy, of the print job has been printed. The display 225 then provides the user the option to increase or decrease the copy count using the user input device 230 on the lit MFP 112a. The display 225 also provides the user the opportunity to either "release" the job or cancel the job. If the job is cancelled, the Host 110 deletes the job from the print queue. If the job is released, the Host 110 submits the job to one or more of the MFPs 112 with the print copy count set to n-1, where n is the originally requested copy count or the altered copy count. If the Host 110 is in standard mode, the lit MFP 112 then proceeds to output the print job according to the copy count set by the Host 110.

If the Host 110 is in tandem mode, the Host 110 initially submits a first copy of a Proof Print job to both of the lit MFP 112a and the unlit MFP 112b for immediate printing. The Host 110 then causes the display 225 of the lit MFP 112a to provide the user with the following options: (1) release the entire remaining copy count to either of the MFPs 112, as specified by the user; (2) release the remaining copy count to both of the MFPs 112; or (3) cancel the print job entirely.

Finally, the fourth print mode of operation is referred to as Private Print mode. When a user specifies Private Print mode for a print job, the printer driver submits the print job to the Host 110. The Host 110 then causes an identifier associated with the private print job to appear in the display 225 of the lit MFP 112a. The user can release the job for printing on the lit MFP 112a by entering a password into the lit MFP 112a using the input device 230. Preferably, the user designates the password on the computer workstation 150 at the time the user submits the print command. Once the user releases the job, the Host 110 submits the print job to the lit MFP 112 for printing. The Host 110 preferably does not operate in tandem mode if the user selects Private Print for a print job. One embodiment of Private Print is described in U.S. Pat. No. 5,970,218, which is incorporated herein by reference.

Returning again to FIG. 3, the Host 110 preferably initiates an error recovery process when an error is identified in the job status of a print job (step 335). The manner in which the Host 110 deals with an error is dependent on the type of error encountered, whether the print job is in standard mode or tandem mode, and the print mode of operation that was selected by the user. If the mode of operation is Print to Specific and the Host 110 detects an error occurrence while the job is printing on an MFP 112, the Host 11 preferably maintains the print job in a print queue until the error is overcome, regardless of the error type. The Host 110 will not reroute a Print to Specific job to an alternate MFP 112. This is because the user has instructed that the print job be handled by a specific MFP 112. Therefore, sending the print job to an MFP 112 other than that specified by the user would be inappropriate. Alternately, the Host 110 issues a notification to the user's computer workstation 150 and provides the user the option to complete the print job at another MFP 110 or printer.

Private Print jobs are also not rerouted when an error is encountered during printing. If the Host 110 detects an error occurrence for a Private Print job, the Host 110 preferably maintains the print job in a print queue until the error is overcome, regardless of the error type. Once the error is overcome, the Host 110 causes the MFP to complete the print job that was interrupted by the error. Alternately, the Host 110 issues a notification to the user's computer workstation 150 and provides the user the option to complete the print job at another MFP 110 or printer.

Figure 4:
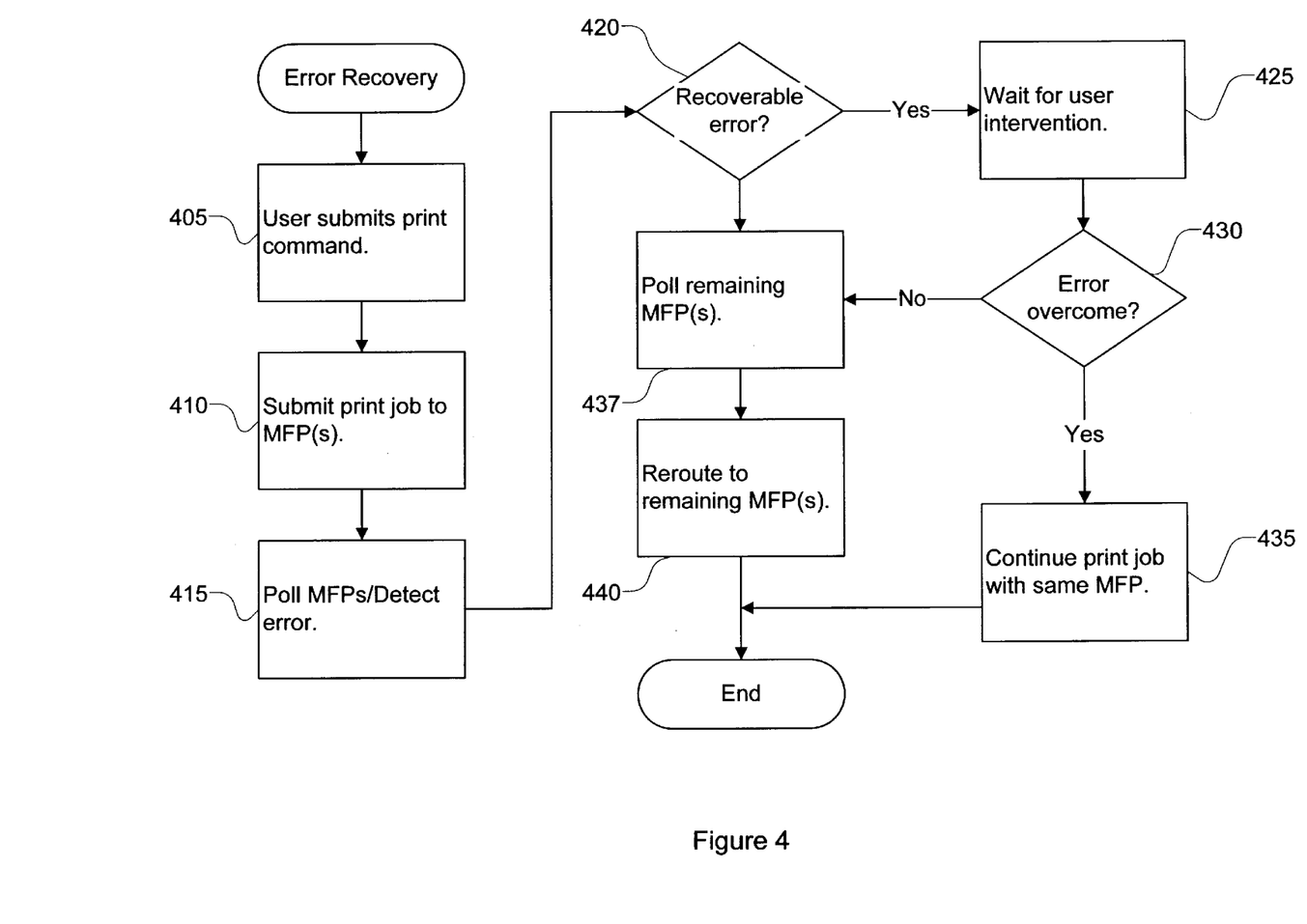
FIG. 4 is a flowchart of a method of performing error recovery in an image processing system.

For Print to Best and Proof Print modes, the Host 110 preferably accomplishes error recovery by rerouting the print job to an alternate MFP 112 in which an error is not present. FIG. 4 shows a flowchart that describes a method of error recovery for Print to Best and Proof Print jobs. The method begins when the user submits a print request from a computer workstation 150 (step 405). The computer workstation 150 then submits the print job to the Host 110. The Host 110 rasterizes print jobs received from the computer workstation 150 into print data (in a form native to the MFPs 112) and transmits the print data to the MFPs 112 (step 410). If the Host 110 is in standard mode, then the print job is submitted to a single MFP 112. If the Host 110 is in tandem mode, then the print job is divided among multiple MFPs 112 to decrease the overall print time. The MFPs 112 then begin printing the print job.

The Host 110 preferably polls the job status of the MFPs 112 to determine whether any errors have occurred and interrupted printing of the job on any of the MFPs 112 (step 415). If an error is detected, the response of the Host 112 is dependent on whether the error is a recoverable error or an unrecoverable error (step 420). If the error is a recoverable error, the Host 110 preferably waits a predetermined time span in order to allow a user sufficient time to take appropriate action to correct the error (step 425). For example, if the error is an out-of-paper error, then the user should be provided sufficient time to re-supply the relevant MFP 112 with paper. Depending on the type of recoverable error detected, the wait time can be varied. Additionally, the Host 110 preferably notifies the computer workstation 150 of the error so that the user can be notified of the error and the job interruption.

If the error is a recoverable error, the Host 110 preferably determines whether the error can be overcome by Host 110 interaction. If so, the Host 110 preferably initiates action to overcome the error. For example, the Host 110 may be able to overcome a job corruption error by resetting the MFP 112 and re-sending the print job to the MFP 112.

Upon occurrence of a recoverable error, the Host 110 preferably also calculates the amount of time that is required to reroute any remaining copies in the print job to another available MFP 112 for printing. If the required time is less than the predetermined wait time, then the Host 110 preferably immediately reroutes the remaining copies in the print job to an error-free MFP 112 and deletes the print job from the print queue of the MFP 112 that incurred the error.

With reference to FIG. 3, if the Host 110 detects that the error has been overcome within the predetermined time span (step 430), then the Host 110 instructs the MFP 112 that was interrupted to continue printing the job (step 435). Advantageously, this approach allows the user an opportunity to fix recoverable errors and reduces the likelihood of paper being wasted on partially-printed jobs that were interrupted by recoverable errors.

If the user does not fix the recoverable error within the predetermined time span, the Host 110 preferably deletes the print job from the print queue of the MFP 112 that incurred the error. The Host 110 then preferably polls the status of the other MFPs 112 to determine which MFPs 112 are available for printing (step 437). Any MFP 112 that is error-free is preferable deemed available for printing. The Host 110 then determines how many unprinted copies are remaining in the copy count. The Host 110 then preferably reroutes the remaining copies in the copy count to one or more error-free MFPs 112, if present. If the Host 110 is in tandem mode, then the Host 110 polls the remaining MFPs and preferably divides the remaining copies in the copy count among the remaining error-free MFPs 112. If the Host 110 is in standard mode, then all copies of the print job are sent to a single MFP 112.

If the Host 110 determines the detected error is an unrecoverable error (step 420), then the Host 110 immediately proceeds to the MFP polling step (step 437). The Host 110 does not provide the user the opportunity to fix unrecoverable errors because, by definition, such errors cannot be fixed by the user. The Host 10 then preferably polls the status of the other MFPs 112 to determine which MFPs 112 are available for printing (step 437). The Host 110 then reroutes the remaining copies in the copy count to available MFPs 112.

Alternately, each MFP 112 prompts the Host 110 when the MFP 112 has completed a print job. That is, if an MFP 112 has completed a print job and has no other jobs to complete, the MFP 112 preferably notifies the Host 110 that the MFP 112 is available to print a job. The Host 110 then preferably assigns any available jobs to the available MFP 112.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

It is claimed:

1. A method of managing error occurrences in an image processing system comprising plural hard output units each communicatively coupled to a single control unit, the control unit being communicatively coupled to a source of a print job, the method comprising:

(a) the control unit sending the print job to each of a plurality of identified hard output units;

(b) the control unit monitoring a status of the print job with respect to each identified hard output unit;

(c) the control unit detecting an error in a first hard output unit with respect to the print job, wherein the error causes the first hard output unit to interrupt printing of the print job;

(d) if the error is not overcome within the predetermined time period, the control unit polling the status of the hard output units other than the first hard output unit to determine whether any other hard output units are error-free;

(e) if the polling indicates that any hard output units are error-free, the control unit sending the print job to one or more of the error-free hard output units.

2. The method of managing error occurrences in an image processing system of claim 1, wherein the print job comprises a single copy of a document, and wherein the control unit sends the print job only to the first hard output unit.

3. The method of managing error occurrences in an image processing system of claim 1, wherein the print job comprises multiple copies of a single document, and wherein the control unit sending the print job to one or more hard output units comprises the control unit dividing the multiple copies of the document between the plural hard output units.

4. The method of managing error occurrences in an image processing system of claim 3, further comprising:

(a) if the error is not corrected within a predetermined time period, the host determining how many copies of the multiple copies of the document remain unprinted;

(b) the host dividing the remaining, unprinted copies of the document between the error-free hard output units.

5. The method of managing error occurrences in an image processing system of claim 1, wherein the detected error comprises the first hard output unit being out of paper.

6. The method of managing error occurrences in an image processing system of claim 1, wherein the detected error comprises the first hard output unit being out of toner.

7. The method of managing error occurrences in an image processing system of claim 1, wherein the detected error comprises the first hard output unit incurring a paper jam.

8. A computer program product comprising a computer usable medium having computer readable software embodied therein for printing a print job from a computer workstation, the computer workstation communicatively coupled to a controller coupled to plural multifunction peripherals for printing, the software including instructions for:

(a) sending the print job to one or more of the plural multifunction peripherals for printing of the print job;

(b) monitoring a status of the print job with respect to each multifunction peripheral that received the print job to determine whether an error is present in any of the multifunction peripherals with respect to the print job;

(c) detecting an error in a first multifunction peripheral with respect to the print job, wherein the error causes the first multifunction peripheral to interrupt printing of the print job;

(d) waiting a predetermined time period to provide time to overcome the error;

(e) if the error is not overcome within the predetermined time period, polling the status of the multifunction peripherals other than the first multifunction peripheral to determine whether any other multifunction peripherals are error-free;

(f) if the polling indicates that any multifunction peripherals are error-free, sending the print job to one or more of the error-free multifunction peripherals.

9. The computer program product comprising a computer usable medium having computer readable software embodied therein for printing a print job from a computer workstation on a network of claim 8, wherein the print job comprises a single copy of a document, and the software further including instructions for sending the print job only to a single multifunction peripheral.

10. The computer program product comprising a computer usable medium having computer readable software embodied therein for printing a print job from a computer workstation on a network of claim 9, wherein the print job comprises multiple copies of a single document, and the software further including instructions for dividing the multiple copies of the document between the plural multifunction peripherals for printing.

11. The computer program product comprising a computer usable medium having computer readable software embodied therein for printing a print job from a computer workstation on a network of claim 10, the software further including instructions for:

(a) if the user does not fix the error within the predetermined time period, determining how many copies of the multiple copies of the document remain unprinted;

(b) dividing the remaining, unprinted copies of the document between the error free plural multifunction peripherals.

12. The computer program product comprising a computer usable medium having computer readable software embodied therein for printing a print job from a computer workstation on a network of claim 9, wherein the detected error comprises the first multifunction peripheral being out of paper.

13. The computer program product comprising a computer usable medium having computer readable software embodied therein for printing a print job from a computer workstation on a network of claim 9, wherein the detected error comprises the first multifunction peripheral being out of toner.

14. The computer program product comprising a computer usable medium having computer readable software embodied therein for printing a print job from a computer workstation on a network of claim 9, wherein the detected error comprises the first multifunction peripheral incurring a paper jam.

15. A printing system for printing a print job, the printing system comprising a control unit for a printer, the control unit including a software program, wherein the software program includes instructions for causing the control unit to:

(i.) send the print job to one or more multifunction peripherals for printing in response to an instruction from the computer workstation, the print job comprising multiple copies of a single document;

(ii.) monitor the status of each of the multifunction peripherals with respect to the print jobs;

(iii.) determine whether a print error has occurred with respect to any of the multifunction peripherals printing the print job, wherein a print error causes the multifunction peripheral to stop printing the print job;

(iv.) if a print error has occurred with respect to a first multifunction peripheral, polling each of the other multifunction peripherals of the plural multifunction peripherals to determine whether any other print errors are present;

(v.) identify which multifunction peripherals are error-free;

(vi.) determine how many copies of the multiple copies of the document remain unprinted;

(vii.) instruct the error-free multifunction peripherals to print the remaining, unprinted copies of the document, wherein the remaining copies of the document are divided among the error-free multifunction peripherals.

16. The printing system for printing a document of claim 15, wherein the print error comprises a hardware failure in the first multifunction peripheral, the hardware failure preventing the first multifunction peripheral from printing.

17. The printing system for printing a document of claim 15, wherein the software program includes instructions for causing the control unit to send the print job to a single multifunction peripheral.

18. The printing system for printing a document of claim 15, wherein the print job comprises multiple copies of a single document, and wherein the software program further includes instructions for causing the control unit to send the print job to multiple multifunction peripherals, wherein each of the multifunction peripherals prints at least one copy of the document.

* * * * *